Figure 1:
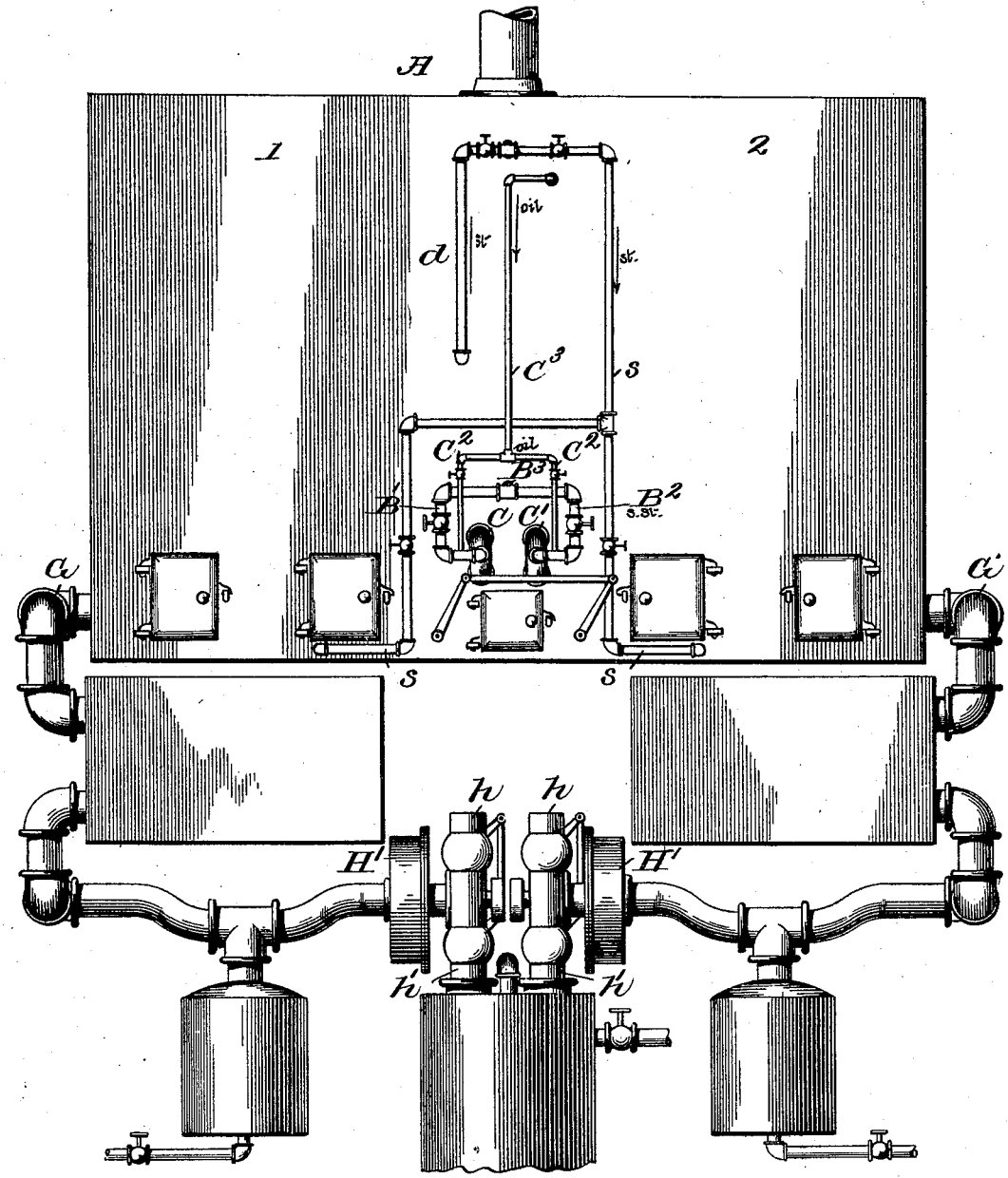

(No Model.) 3 Sheets—Sheet 1.
A. M. HAY.
APPARATUS FOR MANUFACTURING GAS.

No. 581,203. Patented Apr. 20, 1897.

WITNESSES
Jos. E. Stack.
James R. Mansfield.

INVENTOR
Alexander M. Hay
by
Alexander & Dowell
Attorneys (No Model.) 3 Sheets—Sheet 2.
A. M. HAY.
APPARATUS FOR MANUFACTURING GAS.

No. 581,203. Patented Apr. 20, 1897.

WITNESSES
Jos. C. Stack.
James R. Mansfield.

INVENTOR
Alexander M. Hay
by
Alexander & Powell
Attorneys (No Model.) 3 Sheets—Sheet 3.
A. M. HAY.
APPARATUS FOR MANUFACTURING GAS.
No. 581,203. Patented Apr. 20, 1897.
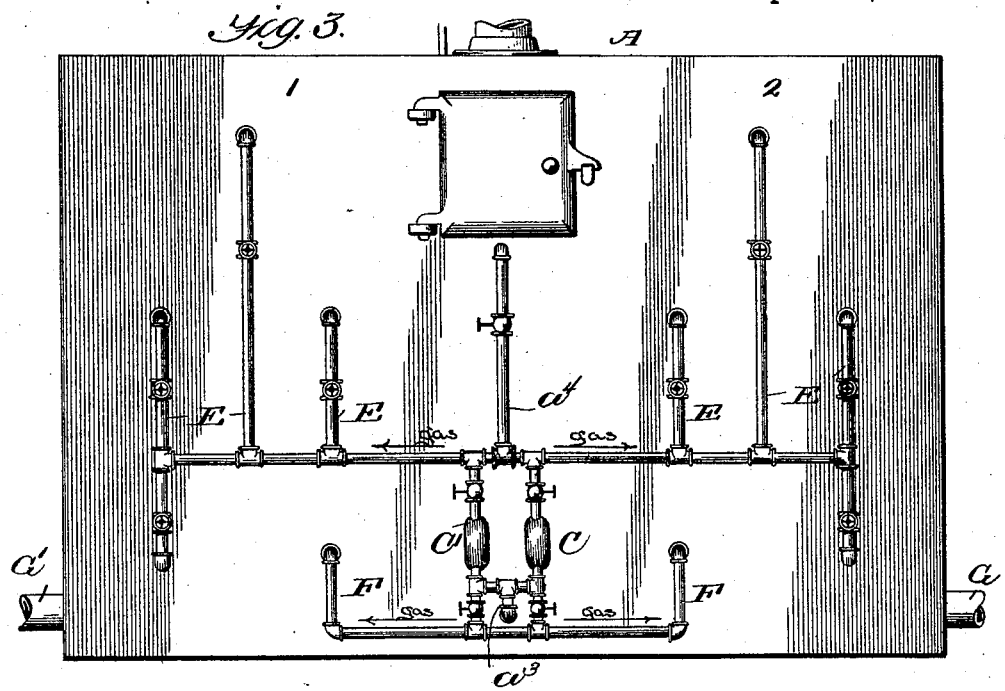
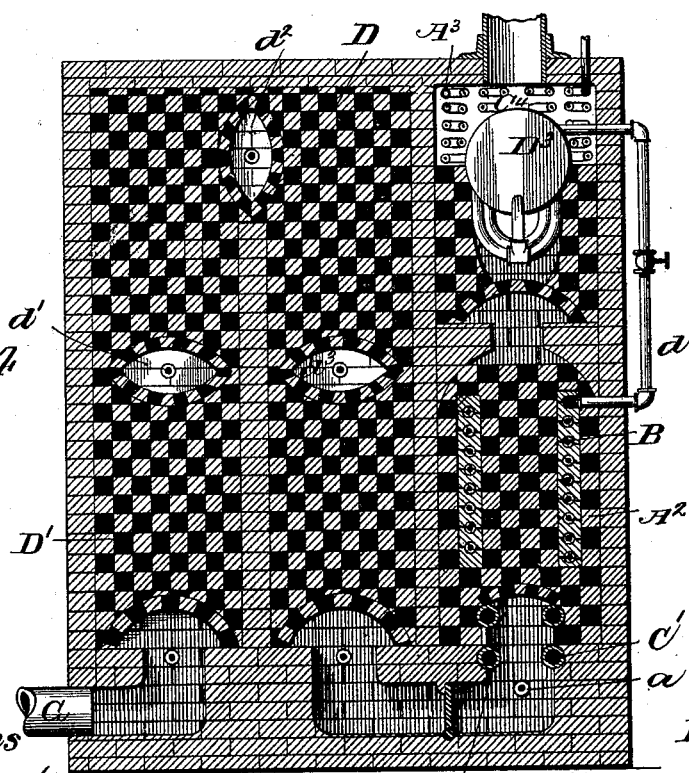
Witnesses
Jos. C. Stack.
James R. Mansfield.
Inventor
Alexander M. Hay
by
Alexander & Dowell
Attys.
THE NORRIS PETERS CO., PHOTO-LITHO., WASHINGTON, D. C.

UNITED STATES PATENT OFFICE.

ALEXANDER MARSHALL HAY, OF DULUTH, MINNESOTA.

APPARATUS FOR MANUFACTURING GAS.

SPECIFICATION forming part of Letters Patent No. 581,203, dated April 20, 1897.

Application filed March 25, 1896. Serial No. 584,882. (No model.)

*To all whom it may concern:*

Be it known that I, ALEXANDER MARSHALL HAY, of Duluth, in the county of St. Louis and State of Minnesota, have invented certain new and useful Improvements in Apparatus for Manufacturing Gas; and I do hereby declare that the following is a full, clear, and exact description thereof, reference being had to the accompanying drawings, and to the letters and figures of reference marked thereon, which form part of this specification.

This invention is an improved apparatus for the manufacture of illuminating-gas from oil and steam, in which the surplus or waste heat products of combustion in the converters or gas-fixing chambers given off in the operation of heating them to the requisite temperature for the manufacture of illuminating-gas are utilized in heating the retorts wherein the gas is generated and in superheating steam used in producing the gaseous mixtures. In connection with this system provision is also made to utilize the waste heat in the gas, which leaves the converters or fixing-chambers at a very high temperature, by passing such gas through a heat-absorbing chamber or flue forming part of the gas-duct, said flue or chamber being made of such form and material that the heat of the gases will be rapidly absorbed therein and thus the gas cooled without the employment of water-coils, and the heat thus obtained from the gas and stored in the duct is subsequently utilized in heating the air which is supplied to support combustion in the converters when the same are being heated for the next operation of fixing the gases, as hereinafter described. By duplicating the converters and gas-ducts the operation of making fixed illuminating-gases may be carried on continuously with great economy in fuel; but the invention is also highly useful where only one converter is employed.

The accompanying drawings illustrate both forms of the apparatus as I propose to manufacture them, but I do not confine myself to the specific construction or combination of parts shown, except where specifically mentioned in the claims.

Figure 2:
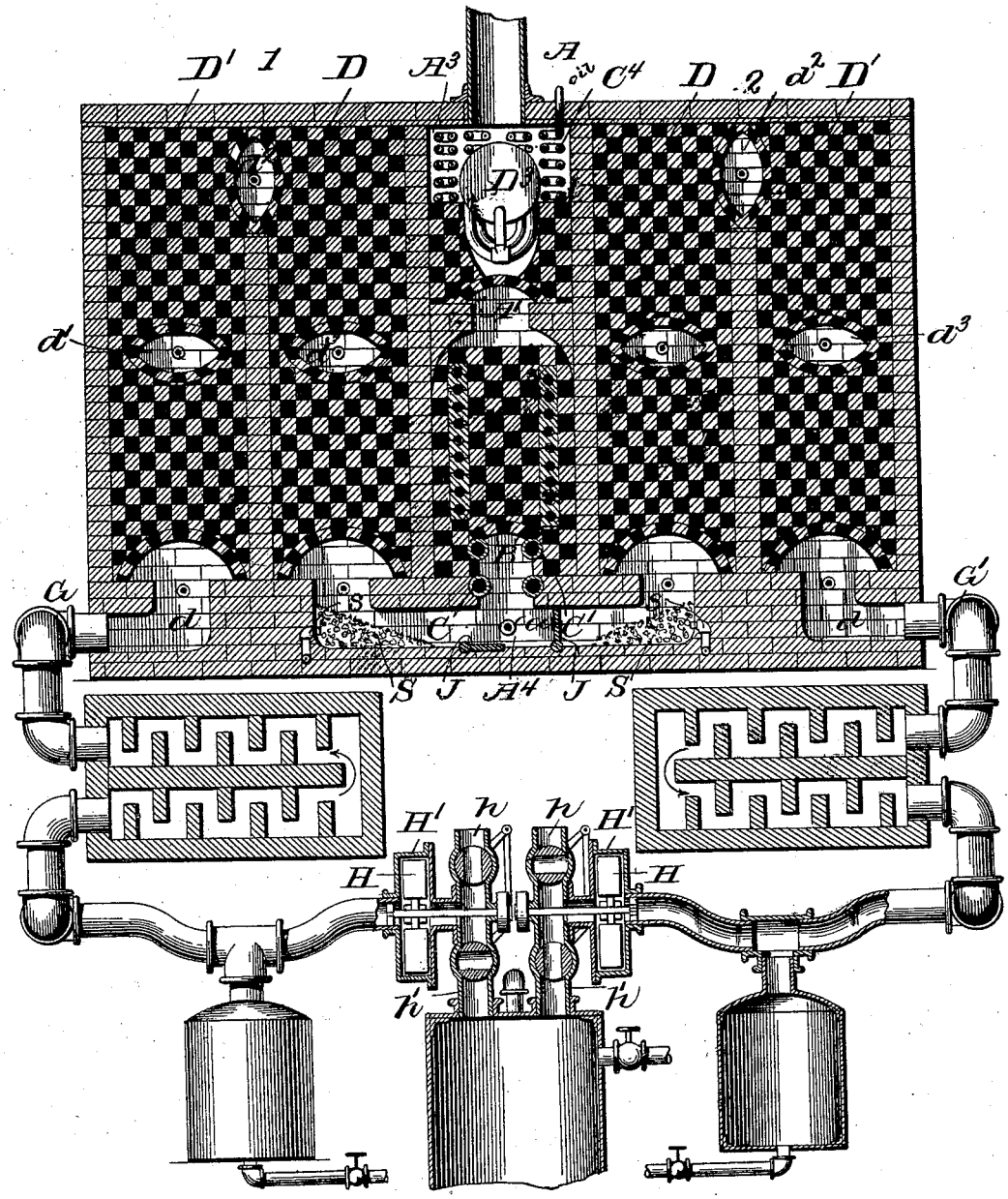

Referring to the drawings, Figure 1 is a front side elevation of a continuous gas-making apparatus embodying my invention. Fig. 2 is a vertical section therethrough. Fig. 3 is a rear elevation thereof. Fig. 4 is a sectional view of an intermittent gas-making apparatus embodying the invention.

A designates a furnace or gas-generator having a central chamber $A'$, within which is a steam-coil B, inclosed in checker-work $A^2$ of fire-brick or other suitable heat-retaining material. Below the steam-coil are two retorts C C', which are arranged to be subjected to great heat and into which superheated steam from a pipe $B^3$, connected to coil B, is admitted through valved pipes $B'$ $B^2$, oil being supplied to the retorts C C' through pipes $C^2$, connected to a supply-pipe $C^3$, as indicated in the drawings.

The oil is drawn from any suitable supply and passed through heating-coils $C^4$ in a chamber $A^3$ above the steam-coil, in which chamber is located a boiler $D^3$, which is heated by the waste products of combustion escaping from chamber $A'$ and is of any suitable construction. Coil B is supplied with steam from boiler D by pipe $d$.

Below chamber $A'$ is a chamber $A^4$, in which is a gas or oil burner $a$ of any suitable construction, by which the apparatus may be primarily heated. Access can be had to this chamber and others hereinafter referred to through suitable doors in the inclosing side walls of the apparatus.

On opposite sides of the generator are converters or gas-fixing chambers 1 and 2, each consisting of a pair of vertical parallel flues D D', the inner one of which communicates at bottom with chamber $A^4$ and at top with the other flue, which at its bottom communicates with the outlet or gas-duct leading to the scrubber or water seal.

The fixing-chambers are constructed alike, so that a description of one applies to both, and similar parts in both are correspondingly lettered.

The fixing-chamber flues are substantially filled with checker-work to mix the gases thoroughly and to absorb and retain heat. In the bottom of flue D' is a small combustion-chamber $d$, and at intervals in the flues are small combustion-chambers $d'$ $d^2$ $d^3$, gas being supplied to these chambers, either or both, from the adjoining retorts C by means of suitably-valved pipes E, arranged as shown in Fig. 3, or in other convenient manner. Gas from either or both retorts C may also be admitted into the lower ends of flues D by means of suitably-valved pipes F, as indicated in Fig. 3. The opposite flues D' communicate at bottom, respectively, with gas-ducts G G', which may lead to a common or separate water or oil seal. The duct G or G' is connected to the casing H' of a fan H, which casing is connected by a valved pipe $h$ with the atmosphere and by another valved pipe $h'$ with the seal. The fan-casing and pipe $h'$ thus form part of the gas-duct, the gas passing therethrough when the valve in pipe $h$ is closed and that in pipe $h'$ opened. When pipe $h$ is closed and pipe $h'$ opened, the fan may be used to exhaust gas, &c., from the duct and converter and force it into the water or oil seal tank, and when the pipe $h$ is open and the pipe $h'$ closed the fan may be used to force air back through the gas-duct and converter. Preferably the valves in pipes $h\ h'$ are mechanically connected in any suitable manner so that when one pipe is opened the other is closed.

The ducts G G' are both made of such size and length and partially filled with such material that the greater part or all the heat in the fixed gases will be absorbed in its passage therethrough, and suitable tar-wells may be placed in the ducts to collect oils, &c., which may be deposited by the gas.

By means of suitable valves J communication between either converter and the generator can be cut off.

The operation of the apparatus thus far described is as follows: After the generator A' is raised to a sufficient temperature to superheat steam in coil B and generate gas in the retorts, and the fixing-chambers have been heated to a proper temperature, which may be accomplished by opening valves J and igniting the jets in the various combustion-chambers already described, (air being forced in through pipes G G' to support combustion,) the converter No. 1 is shut off from the generator, while the combustion of gas is maintained in converter No. 2, the products of combustion therein passing through the generator and maintaining the temperature thereof. The gas generated in one or both retorts C C', if a uniform quality of gas is being made in both retorts—except what is used to support combustion in converter No. 2—is then directed through pipe F into converter No. 1 and fixed therein, the gases passing thence through the proper duct and oil seal to the holder. In passing through the duct the gases are cooled and the duct heated. When the temperature of converter No. 1 drops to the point where regeneration is necessary, the gas-supply is cut off therefrom and the duct and converter exhausted of gas until danger of explosion by the admission of air is obviated. Then the valves in pipes E are shifted to prevent entrance of firing-gas into converter No. 2 and admit firing-gas into converter No. 1, where it is fired, and currents of fresh air are forced back through the duct into converter No. 1, while gas to be fixed is admitted from pipe F into converter No. 2 and passed therethrough into duct G', and thence to the tank, &c. The air passing through duct G to converter No. 1 is highly heated by the heat derived from the previous passage of hot gases, and therefore the chamber No. 1 is easily raised to the requisite temperature. When the temperature of converter No. 2 drops below the desired point, the gas from pipe F is shut off therefrom and it is fired up, air being forced into converter No. 2 through the hot gas-duct, while converter No. 1 is used to fix the gas, as before described.

It will be observed from this description that the converters are used alternately as combustion-chambers and fixing-chambers, and that the generator, being continually heated by products of combustion from one or the other converter, is always maintained at a high temperature and the gas practically generated and fixed continuously, except during the slight intervals required to shift the valves. Further, it will be observed that the heated fixed gases are cooled by directing them through a heat-absorbing duct, and such heated duct is subsequently utilized to heat the air supplied to support combustion in heating the converters. Thus the heat of the fixed gases, which is ordinarily wasted, is utilized to heat the incoming air and the heat is practically transferred back and forth from the converter to the duct, and vice versa. In short, the converters 1 and 2 are alternately combustion and fixing chambers and the ducts G and G' alternately gas-coolers and air-heaters. I then utilize heat derived from the converters in the operation of making the fixed gases to assist in maintaining or restoring the temperature in the same converters in which the fixed gases were made; and, further, the waste products of combustion or heat escaping from the converters when being regenerated for gas-making are used in the producer to make gas or gaseous mixtures to be alternately combusted or fixed in the converter-chambers. Thus a portion of the surplus heat from the double operation is utilized again and again, rebounding from chamber with each change of operation, thereby effecting an economy in fuel greater than where the operation is simply one of utilizing waste heat for a specific operation.

By using the double set of converters and ducts the greatest economy and practically continuous production of gas is realized, but a very efficient and economical apparatus can be produced by the employment of a single converter, and in Fig. 4 I have indicated such a construction. Parts in this apparatus corresponding to those in that above described are lettered accordingly, and thus detailed description thereof is unnecessary. In operation, however, this last apparatus would necessarily be intermittent, but great economy of heat of waste gases and of the fixed gases would be realized, and the generator could be heated by the products of combustion in the converter, as before.

The fact that no cold air is introduced into either apparatus after once being started in operation is a factor in the economical working of the apparatus, as the mass of material is maintained at a higher temperature than would be possible were cold air introduced into converters and generator, while the heat required to accomplish the results aimed at is more uniform throughout the entire operation.

By employing two retorts I am enabled to make two qualities of gas at the same time, and this enables me to use the apparatus economically, as an inferior gas can be made in one retort and used to support combustion in the converters when firing them up, and a richer gas can be made in the other retort, which when fixed will be of proper illuminating power. The retorts can be thus used for producing the same or different gases, as desired. Gas may also be conducted from either retort into the chamber $A^4$ below the generator by a pipe $a^3$, so that, if desired, combustion may be produced below and within the generator; but this will be found desirable only when the apparatus is being initially started in operation or when its productive capacity is being pushed to the utmost. Gas may also be introduced directly under the boiler through a pipe $a^4$, if it is desired to increase the amount of steam generated.

Where it is desired to make a gas very rich in hydrogen, I place in the lower part of the flue D of the converter a quantity of metal scrap, preferably steel or iron cuttings, as indicated at S, Fig. 2. Then when the gas is introduced into the converter to be fixed I introduce a small jet of steam into the scrap-iron S through a pipe $s$, and the steam impinging on the hot metal oxidizes the latter and large quantities of hydrogen gas are developed, which is commingled with the hydrocarbon gas and fixed therewith in passing through the converter, and if it is desired to enrich the gas hydrocarbon oils or gases can be introduced into the chambers $d'$ $d^2$ $d^3$, so that increments of hydrocarbon are successively added to the gases traversing the converter and intimately mixed and associated therewith before the gases enter the ducts.

Having thus described my invention, what I therefore claim as new, and desire to secure by Letters Patent thereon, is—

1. In a gas-making apparatus, the combination of a generator for producing gas; a series of converters communicating with the inlet or combustion chamber of the generator; means for producing combustion in said converters alternately; means for causing the products of combustion from any converter to traverse the generator and flow therethrough in the same direction, and means for directing the gases produced in the generator into the converters which have been previously fired, during the firing of other converters, whereby the generator is continually heated by the waste products of combustion resulting from the firing of converters, and gas can be continuously generated, substantially as and for the purpose described.

2. In a gas-making apparatus, the combination of a generator for producing gas; a series of converters communicating with the inlet or combustion chamber of the generator; means for producing combustion in said converters alternately; means for causing the products of combustion from any converter to traverse the generator and flow therethrough in the same direction, and means for directing the gases produced in the generator into the converters which have been previously fired, during the firing of other converters, whereby the generator is continually heated by the waste products of combustion resulting from the firing of converters, and gas can be continuously generated; with ducts connected to said converters adapted to absorb heat from the hot fixed gases passing therethrough; and means for sending air back through these ducts, to support the combustion in said converters; whereby the air is heated by heat derived from the fixed gases, all substantially as and for the purpose described.

3. In a gas-making apparatus the combination of a gas-generator, through which the products of combustion flow continually in one direction, a converter connected to said generator, means for primarily firing said converter and directing the products of combustion through the generator to heat the latter; and means for directing gases from the generator through the converter to be fixed therein, the converter being used alternately as a combustion-chamber, and gas-fixing chamber, substantially as and for the purpose described.

4. In a gas-making apparatus the combination of a gas-generator through which the products of combustion flow continually in one direction, a converter connected to said generator, means for primarily firing said converter and directing the products of combustion through the generator to heat the latter; and means for directing gases from the generator through the converter to be fixed therein, the converter being used alternately as a combustion-chamber, and gas-fixing chamber, with a duct connected with said converter through which the fixed gases are passed and cooled by the absorption of their heat by the walls or internal structure of the duct when the converter is used as a gas-fixer; and means for forcing air back through said duct into the converter when the latter is being fired, substantially as and for the purpose described.

5. In a gas-making apparatus the combination of a gas-generator through which products of combustion flow in but one direction comprising a steam heating-pipe, a steam and oil vaporizing retort, a boiler and oil-heating coils, substantially as described, with a converter communicating at bottom with said generator and adapted to supply products of combustion thereto; means for cutting off communication between said converter and generator; gas-pipes leading from the retort into the converter; and oil and steam supply pipes; all substantially as and for the purpose described.

6. In a gas-making apparatus, the combination of a pair of opposite similar converters, adapted to serve alternately as gas-fixers, and combustion-chambers one being fired while the other is fixing gas; a gas-generator through which the products of combustion pass in but one direction communicating with and heated by the products of combustion in the converters and means for directing the products of combustion from either converter into the generator, while gases from the generators are being fixed in the other converter, whereby the process of generating gas goes on continually in one generator while the converters are alternately fired, substantially as and for the purpose described.

7. In a gas-making apparatus, the combination of a pair of opposite similar converters, adapted to serve alternately as gas-fixers, and combustion-chambers one being fired while the other is fixing gas; a gas-generator through which the products of combustion pass in but one direction communicating with and heated by the products of combustion from the converters and means for directing the products of combustion from either converter into the generator, while gases from the generator are being fixed in the other converter, whereby the process of generating gas goes on continually in one generator while the converters are alternately fired; with ducts respectively connected to said converters and adapted to serve as gas-coolers when the converters are used as gas-fixers, and as air-heaters when the converters are used as combustion-chambers and means for forcing air through said ducts to be heated therein, all substantially as and for the purpose described.

8. The herein-described gas-making apparatus, consisting of the generator A having coil B and retort C; and adapted to be heated by waste gases from the gas-fixing chambers; with the converter or fixing-chamber having a pair of vertical parallel flues D, D', filled with checker-work and having a series of interior combustion-chambers, means for closing the burned-products passage between the converter and generator; and pipes for conducting gases from the retort into the converter, all substantially as and for the purpose described.

9. The combination of a converter adapted to be used alternately as a firing-chamber and as a gas-fixing chamber, with a generator heated by the products of combustion from the converter when the latter is used as a firing-chamber, means for closing communication between the converter and generator when the firing is ended; and means for then introducing gases to be fixed into the converter from the generator, substantially as and for the purpose described.

10. The herein-described gas-making apparatus, comprising a gas-generator having heating-coils and a retort, and adapted to be heated by waste products of combustion which flow continually therethrough in but one direction; a plurality of converters, adapted to be also used as firing-chambers; each converter having means for producing combustion in it for heating it, and having an outlet communicating with the inlet end of the generator; means for closing the said outlets of the converters after they have been fired; said converters to be fired alternately; means for conducting gases from the retorts into any converter after it has been fired, to be fixed therein; and means for conducting gases from the retort into the other converter or converters to support combustion therein; whereby the generator is supplied with a continuous current of products of combustion from some one of the converters, while the gas generated in the generator can be fixed in some other of the converters, all substantially as and for the purpose described.

11. The herein-described gas-making apparatus, comprising a gas-generator having heating-coils and a retort, and adapted to be heated by waste products of combustion which flow continually therethrough in but one direction; a plurality of converters, adapted to be also used as firing-chambers; each converter having means for producing combustion in it for heating it, and having an outlet communicating with the inlet end of the generator; means for closing the said outlets of the converters after they have been fired, said converters to be fired alternately; means for conducting gases from the retorts into any converter after it has been fired, to be fixed therein; and means for conducting gases from the retort into the other converter or converters to support combustion therein; whereby the generator is supplied with a continuous current of products of combustion from some one of the converters, while the gas generated in the generator can be fixed in some other of the converters; with ducts for conducting fixed gases from the converters to the reservoir, adapted to absorb heat therefrom, and means for forcing air back through said ducts to the converters when it is to be fired, all substantially as and for the purpose set forth.

In testimony that I claim the foregoing as my own I affix my signature in presence of two witnesses.

ALEXANDER MARSHALL HAY.

Witnesses:
VIRGIL W. BLANCHARD,
ARTHUR E. DOWELL.